United States Patent Office 3,422,085
Patented Jan. 14, 1969

3,422,085
RECOVERY AND PURIFICATION OF
MICROBIAL POLYSACCHARIDES
James W. Gill and Peter G. Lim, Wilmington, Del., assignors to Hercules Incorporated, Wilmington, Del., a corporation of Delaware
No Drawing. Filed July 29, 1966, Ser. No. 568,744
U.S. Cl. 260—209
Int. Cl. C08b *19/00*
5 Claims

ABSTRACT OF THE DISCLOSURE

A process is provided for the recovery and purification of microbial polysaccharides in one operation from their fermentation broths by agitating the fermentation broths in the presence of a polyethoxylated quaternary ammonium compound. This precipitates the polysaccharide complexed with the polyethoxylated quaternary ammonium compound and leaves behind the spent microbial cells. The microbial polysaccharide may be separated from the complex by well known conventional techniques, at least one of which is disclosed.

---

This invention relates to a process of recovering and purifying microbial polysaccharides and more particularly to a process of recovering and purifying microbial polysaccharides from their fermentation broths in one unit operation.

Heretofore considerable difficulty has been encountered in recovering and purifying microbial polysaccharides. At the end of the fermentation by which these microbial polysaccharides are produced, they occur dissolved in the aqueous fermentation broth to a low degree of concentration (usually about 1.5% dry weight basis on total fermentation broth). The fermentation broth also contains many other materials, the most troublesome of which in the recovery and purification of the polysaccharides are the spent or dead microbial cells. It is known that microbial polysaccharides can be recovered from their fermentation broths by such methods e.g. as precipitating with alcohols, inorganic salts and quaternary ammonium compounds. One drawback of using alcohols and other organic liquid precipitants is that large amounts are required. A far more serious drawback of these prior art methods is that the microbial cells are precipitated along with the polysaccharide in one gelatinous mass unless the cells have been previously removed by a separate operation. However because of the high viscosity of the fermentation broths, due primarily to the thickening effect of the microbial polysaccharides dissolved therein, removal of the microbial cells has been an extremely difficult problem. Heretofore the only effective way found for removing the microbial cells is by centrifugation, but the adverse economics of this method has prevented its commercial use.

According to the present invention an effective and economical means has been found of selectively precipitating microbial polysaccharides from their fermentation broths and leaving most of the microbial cells behind dispersed in the fermentation broth (i.e. the resulting supernatant), thus combining recovery and purification of microbial polysaccharides into one unit operation.

More specifically, according to the present invention it has been found that the results set forth in the immediately preceding paragraph are accomplished by carrying out the process which comprises agitating the fermentation broth in the presence of a polyethoxylated quaternary ammonium compound thereby precipitating the polysaccharide complexed with the polyethoxylated quaternary ammonium compound and leaving behind the major portion of the microbial cells suspended in the supernatant, and removing said precipitate from said supernatant, the polyethoxylated quaternary ammonium compound having the formula

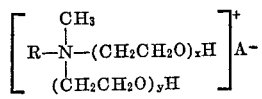

wherein R is an alkyl chain derived from a fatty acid selected from the group consisting of oleic, stearic and coco, wherein A⁻ is any conventional anion such as e.g. chloride, acetate, nitrate, sulfate, etc., and wherein the sum of $x$ and $y$ is about 7–23. This gives the microbial polysaccharide in one unit operation in a substantially pure state (i.e. free of a major portion of the microbial cells) complexed with the polyethoxylated quaternary ammonium compound. The microbial polysaccharide may be obtained from this complex by agitating the complex in the presence of an organic liquid having an ionic compound, such as e.g. an alkali metal salt, dissolved therein in which resulting solution the polyethoxylated quaternary ammonium compound is substantially soluble and in which the complex and polysaccharide are substantially insoluble thereby dissolving the polyethoxylated quaternary ammonium compound in said organic liquid, and separating the resulting dissociated polysaccharide from said organic liquid. If the microbial polysaccharide is desired in a still higher degree of purity, this can be accomplished by washing the complex prior to dissociation.

The examples given hereinafter illustrate specific embodiments of the present invention. However, these examples are not intended to restrict the present invention beyond the scope of the appended claims. In the examples and elsewhere herein, unless otherwise indicated, percent is by weight and concentration of polysaccharide is on a dry weight basis. All viscosities given herein were determined at approximately 25° C. using a Brookfield Synchro-Lectric LVF viscometer.

EXAMPLES 1–5

In these examples there was used the microbial polysaccharide fermentation broth from a pilot plant fermentation of *Arthrobacter viscosus* NRRL B–1973. This fermentation broth had a polysaccharide concentration of about 1.5% and a viscosity of about 13,800 cps. The fermentation broth was diluted with 4 volumes of distilled water so that the diluted fermentation broth had a polysaccharide concentration of about 0.3%. To 10 ml. aliquots of this diluted fermentation broth was added while stirring approximately 0.1 ml. of different types of materials (precipitants) in an effort to precipitate the polysaccharide. Examples 1–3 precipitants were added as a 95% aqueous solution thereof, Examples 4 and 5 precipitants were added as a 50% isopropyl alcohol (IPA) solution thereof (this being the form in which they are commercially available).

The fact that no measurable viscosity was left in the supernatant in all 5 examples indicates that substantially all of the polysaccharide precipitated. The fact that the supernatant was cloudy in Examples 1–3 and clear in Examples 4 and 5 indicates that a major portion of the microbial cells remained behind suspended in the supernatant in the former and that substantially all of the microbial cells precipitated along with the polysaccharide in the latter. Microscopic examination of the supernatant in Examples 1–5 substantiated the foregoing. This clearly demonstrates that the precipitants of the present invention selectively precipitate microbial polysaccharides and leave behind suspended in the supernatant a major portion of the microbial cells, and that the prior art precipitants precipitate substantially all of the microbial cells along with the microbial polysaccharides.

Further details appear in Table 1 hereinafter.

TABLE 1

| Example No. | Precipitant | Polysaccharide precipitation | Supernatnat broth appearance |
|---|---|---|---|
| 1 | Stearl, di (polyoxyethylene) methyl ammonium chloride.[1] | Yes | Cloudy. |
| 2 | Oleyl di (polyoxyethylene) methyl ammonium chloride.[1] | Yes | Do. |
| 3 | Coco di (polyoxyethylene) methyl ammonium chloride.[1] | Yes | Do. |
| 4 | Palmitic trimethyl ammonium chloride. | Yes | Clear. |
| 5 | Coco trimethyl ammonium chloride. | Yes | Do. |

[1] The names of the compounds as given here and elsewhere herein refer to those described by the structural formula given hereinbefore, in which the total polyoxyethylene content is about 15 oxyethylene units per molecule.

EXAMPLE 6

To 1 liter of the diluted fermentation broth used in Examples 1–5 hereinbefore there was added with stirring 20 ml. of a 20% aqueous solution of stearyl di(polyoxyethylene) methyl ammonium chloride (hereinafter called the precipitant). The precipitate which formed (i.e. the microbial polysaccharide complexed with the precipitant) was separated from the supernatant by filtration and divided into two portions. One portion of the complex was washed 5 times in a Waring Blendor with 200 ml. portions of a 0.4% aqueous solution of the precipitant. The washed complex was then agitated (extracted) twice with 200 ml. portions of IPA having dissolved therein 0.15% potassium acetate, followed by washing once with IPA alone. The microbial polysaccharide product thus obtained was dried in a vacuum oven at 45° C. The other portion of the complex was processed in the same way as the first portion except the washing step was omitted. A 0.5% aqueous solution of the microbial polysaccharide product from each portion was stained with acid fuchsin; each portion was then divided into 10 equal parts and the number of microbial cells present in each of these 20 parts was determined by counting under a microscope. These counts showed that the above-described washing of the complex removed approximately 65% of the small amount of microbial cells which came down with the complex during precipitation. More specifically, the unwashed but extracted material contained 66.3 microbial cells per unit volume whereas the washed and extracted material contained only 23.5 microbial cells per unit volume (average number of cells in 10 equal portion specimens for each).

EXAMPLE 7

In this example there was used the microbial polysaccharide fermentation broth from a fermentation of *Arthrobacter stabilis* NRRL B–3225. This fermentation broth had a polysaccharide concentration of about 1.2% and a viscosity of about 6000 cps. 100 ml. of the fermentation broth was diluted with 1 volume of distilled water. To 200 ml. of the diluted fermentation broth was added with stirring 20 ml. of a 20% aqueous solution of stearyl di(polyoxyethylene) methyl ammonium chloride. The precipitate which formed, i.e. the microbial polysaccharide complexed with the stearyl di(polyoxyethylene) methyl ammonium chloride, was separated from the supernatant by filtration. The complex was washed once with about 1 liter of water. The washed complex was then agitated (extracted) twice with 300 ml. portions of IPA having dissolved therein 0.15% potassium acetate, followed by washing once with 300 ml. of IPA alone and finally once with 300 ml. of acetone. The microbial polysaccharide product thus obtained was dried in a vacuum oven at 37° C. to give 1.2 grams of product.

To another 100 ml. portion of said undiluted fermentation broth was added with stirring 900 ml. of methanol having dissolved therein 0.1% of potassium chloride. The precipitate which formed was separated from the supernatant by filtration. The precipitate was washed once with 200 ml. of methanol alone and then with 200 ml. of acetone. The microbial polysaccharide thus obtained was dried in a vacuum oven at 37° C. to give 1.6 grams of product.

The total amount of each of the two microbial polysaccharide products obtained in accordance with the procedure set forth in the immediately preceding two paragraphs was dissolved in 100 ml. of a 1.0% aqueous solution of sodium chloride, and the viscosity of each was measured. The 1.6 grams of methanol precipitated product gave a viscosity of 4400 cps. The 1.2 grams of stearyl di(polyoxyethylene) methyl ammonium chloride precipitated product gave a viscosity of 4200 cps. As can be seen, these two viscosity values are substantially the same. It will also be noted that the 1.2 grams of product in the one case (present invention) represents a 100% recovery of the microbial polysaccharide present in the fermentation broth used at the start of the experiment, and that the 1.6 grams of product in the other case (prior art methanol precipitation process) represents a recovery substantially greater than the amount of microbial polysaccharide present in the fermentation broth used at the start of the experiment. Hence the latter precipitate must have contained at least 0.4 gram of impurities, mostly microbial cells. The supernatant resulting from precipitating with stearyl di(polyoxyethylene) methyl ammonium chloride was cloudy whereas the supernatant resulting from precipitating with methanol was clear, which is further evidence that the former precipitated the microbial polysaccharide and left behind suspended in the supernatant substantially all of the microbial cells and that the latter took down substantially all of the microbial cells with the microbial polysaccharide precipitate. There was also a marked difference in the physical characteristics of the precipitates produced from the fermentation broths. The precipitate of microbial polysaccharide complexed with the stearyl di(polyoxyethylene) methyl ammonium chloride was soft and coalescent and separated with ease from the supernatant simply by filtering. Likewise no difficulty was encountered in further processing this precipitate. In contrast the precipitate produced with methanol was gelatinous and separated with considerable difficulty from the supernatant, and in fact it tended to plug up even a large mesh screen.

The foregoing contrast between the present invention and the prior art, i.e. employing stearyl di(polyoxyethylene) methyl ammonium chloride versus methanol as a precipitant, is also true of other prior art processes, e.g. those using as precipitants salts and quaternary ammonium compounds. More specifically, the present invention (1) precipitates microbial polysaccharides from their fermentation broths leaving the microbial cells behind suspended in the supernatant and (2) gives precipitates which are soft and coalescent and easily further processed, whereas the prior art methods take down the microbial cells along with the microbial polysaccharide and (3) give gelatinous precipitates.

In the course of isolating the polysaccharide producing bacterium *Arthrobacter stabilis* NRRL B–3225, five additional but unidentified polysaccharide producing microorganisms were obtained. The polysaccharides produced by these five microorganisms were precipitated from their fermentation broths in accordance with the present invention employing the precipitant stearyl di(polyoxyethylene) methyl ammonium chloride.

From the foregoing examples it will be seen that the process of the present invention makes substantial contributions to the prior art. The present invention provides a process whereby microbial polysaccharides are simultaneously recovered and purified with ease from their aqueous fermentation broths, and this is made possible by the use of certain materials which selectively precipitate the microbial polysaccharides while leaving behind suspended in the supernatant substantially all of the spent or dead microbial cells.

The present invention involves starting with microbial polysaccharide fermentation broths (1) obtaining the microbial polysaccharides therefrom complexed with one of the precipitants of the present invention either with or without subsequently washing the complex, (2) or continuing the process to obtain the microbial polysaccharides dissociated from said precipitant either with or without first washing the complex. However, the process of dissociating the microbial polysaccharides from said precipitant is known and not per se a part of the present invention.

The present invention is applicable to anionic microbial polysaccharides in general. These include, e.g., microbial polysaccharides produced by the microorganisms from (1) *Arthrobacter viscosus* NRRL B–1973, (2) *Arthrobacter viscosus* NRRL B–1797, (3) *Arthrobacter stabilis* NRRL B–3225, (4) *Cryptococcus laurentii* var. *flavescens* NRRL Y–1401, (5) *Hansenula holstii* NRRL Y–2154, (6) *Hansenula holstii* NRRL Y–2155, (7) *Hansenula holstii* NRRL Y–2448, (8) *Xanthomonas campestris* NRRL B–1459. Fermentation processes for producing microbial polysaccharides employing these microorganisms are well known and involve conventional fermentation techniques. For instance, the microbial polysaccharides used herein were prepared by conventional fermentation substantially as set forth in U.S. Patent No. 3,228,855.

The polyethoxylated quaternary ammonium compound precipitants applicable in the present invention are those with the general structural formula

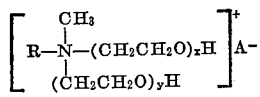

The R moiety in this formula may be a stearyl group, oleyl group, or a mixture of "fatty" groups such as those found in coconut oil and other natural oils such as for example peanut and corn oil. The sum of x and y (i.e. the total oxyethyl units) in this formula may be about 7–23, but preferably is about 15. A⁻ in this formula may be any conventional anion such as e.g. chloride, acetate, nitrate, sulfate, etc.

The ratio of polyethoxylated quaternary ammonium compound precipitant to microbial polysaccharide employed in the present invention is not critical but preferably is about 0.4/1–2/1, 1/1 being specifically preferred. Higher concentrations than 2/1 can be used but to no substantial advantage in most cases. Lower concentrations than 0.4/1 give some precipitation but not as much as desired, and the recovery of the precipitate is hindered.

Dissociation of the microbial polysaccharide-polyethoxylated quaternary ammonium compound complexes of the present invention, as stated hereinbefore, is known and not per se a part hereof. For the sake of completeness, however, this will now be described briefly. In general the complexes of the present invention may be dissociated by the same means heretofore used for dissociating prior art complexes of microbial polysaccharide with non-polyethoxylated quaternary ammonium compounds. Thus, the microbial polysaccharide-polyethoxylated quaternary ammonium compound complexes of the present invention may be dissociated with (e.g. agitating the complexes in the presence of) an organic liquid having an ionic compound dissolved therein in which resulting solution the polyethoxylated quaternary ammonium compound is substantially soluble and in which the complex and microbial polysaccharides are substantially insoluble thereby dissolving the polyethoxylated quaternary ammonium compound in said organic liquid. Typical organic liquids include e.g. methanol, ethonal, isopropanol, butanol, acetone, methyl ethyl ketone. Salts and acids in general are applicable ionic compounds. Typical and particularly suitable salts and acids include e.g. (1) alkali metal salts such as for instance the acetates and chlorides of sodium and potassium, and (2) acids such as for instance hydrochloric, phosphoric, sulfuric, chloroacetic.

Dilution of the fermentation broths prior to precipitation is not necessary but usually gives better results.

Whether or not the complex of the present invention is dissociated and/or washed depends on the degree of purity desired in the final product and this in turn depends on the use to be made of the final product. All of these products have utility. Washing the complex with water alone gives some increase in purity, however, washing with an aqueous solution of one of the precipitants of the present invention gives a substantially greater increase in purity. Good results have been obtained when washing the complex with about a 0.2%–0.4% aqueous solution of the precipitants. However, this concentration is not critical, and lower or higher concentrations can be used. Although not necessary, preferably the type agitator used during washing will be one which will give a relatively high shear such as e.g. a Waring Blendor.

Another important advantage of the present invention, in addition to those set forth hereinbefore, is that the oral and cutaneous toxicities of the polyethoxylated quaternary ammonium compounds of the present invention are substantially less than prior art compounds.

Several useful applications of the microbial polysaccharides to which the present invention is applicable are known, including thickening and suspending agents for foods, oil well recovery fluids, etc. The higher purity products are usually required or preferred for such uses e.g. as foods.

As many apparent and widely different embodiments of this invention may be made without departing from the spirit and scope thereof, it is to be understood that the invention is not limited to the specific embodiments thereof except as defined in the appended claims.

What we claim and desire to protect by Letters Patent is:

1. Process of recovering and purifying microbial polysaccharides from their aqueous fermentation broths which comprises agitating the broth in the presence of a polyethoxylated quaternary ammonium compound thereby precipitating the polysaccharide complexed with the polyethoxylated quaternary ammonium compound and leaving behind the major portion of the microbial cells suspended in the supernatant, and removing said precipitate from said supernatant, the polyethoxylated quaternary ammonium compound having the formula

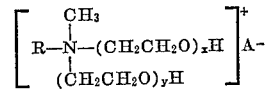

wherein R is an alkyl chain derived from a fatty acid selected from the group consisting of oleic, stearic and coco, wherein A⁻ is an anion, and wherein the sum of x and y is about 7–23.

2. Process of claim 1 wherein the sum of x and y is about 15.

3. Process of recovering and purifying microbial polysaccharides from their aqueous fermentation broths which comprises agitating the broth in the presence of a polyethoxylated quaternary ammonium compound thereby precipitating the polysaccharide complexed with the polyethoxylated quaternary ammonium compound and leaving behind the major portion of the microbial cells suspended in the supernatant, removing said precipitate from said supernatant, agitating said precipitate in the presence of an organic liquid having an ionic compound dissolved therein in which resulting solution the polyethoxylated quaternary ammonium compound is substantially soluble and in which the complex and polysaccharide are substantially insoluble thereby dissolving the polyethoxylated quaternary ammonium compound in said organic liquid, and separating the resulting dissociated polysaccharide from said organic liquid, the polyethoxylated quaternary ammonium compound having the formula

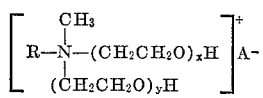

wherein R is an alkyl chain derived from a fatty acid selected from the group consisting of oleic, stearic and coco, wherein A⁻ is an anion, and wherein the sum of $x$ and $y$ is about 7–23.

4. Process of recovering and purifying microbial polysaccharides from their aqueous fermentation broths which comprises agitating the broth in the presence of a polyethoxylated quaternary ammonium compound thereby precipitating the polysaccharide complexed with the polyethoxylated quaternary ammonium compound and leaving behind the major portion of the microbial cells suspended in the supernatant, removing said precipitate from said supernatant, washing said precipitate, agitating said precipitate in the presence of an organic liquid having an ionic compound dissolved therein in which the polyethoxylated quaternary ammonium compound is substantially soluble and in which the complex and polysaccharide are substantially insoluble thereby dissolving the polyethoxylated quaternary ammonium compound in said organic liquid, and separating the resulting dissociated polysaccharide from said organic liquid, the polyethoxylated quaternary ammonium compound having the formula

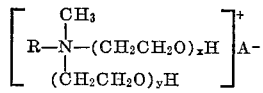

wherein R is an alkyl chain derived from a fatty acid selected from the group consisting of oleic, stearic and coco, wherein A⁻ is an anion, and wherein the sum of $x$ and $y$ is about 7–23.

5. Process of recovering and purifying microbial polysaccharides from their aqueous fermentation broths which comprises agitating the broth in the presence of a polyethoxylated quaternary ammonium compound thereby precipitating the polysaccharide complexed with the polyethoxylated quaternary ammonium compound and leaving behind the major portion of the microbial cells suspended in the supernatant, removing said precipitate from said supernatant, washing said precipitate, agitating said precipitate in the presence of an organic liquid having an alkali metal salt dissolved therein in which the polyethoxylated quaternary ammonium compound is substantially soluble and in which the complex and polysaccharide are substantially insoluble thereby dissolving the polyethoxylated quaternary ammonium compound in said organic liquid, and separating the resulting dissociated polysaccharide from said organic liquid, the polyethoxylated quaternary ammonium compound having the formula

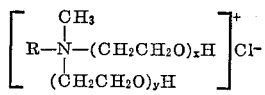

wherein R is an alkyl chain derived from a fatty acid selected from the group consisting of oleic, stearic and coco, and wherein the sum of $x$ and $y$ is about 7–23.

References Cited

UNITED STATES PATENTS 2,853,414   9/1958   Wimmer _____ 260—209
3,119,812   1/1964   Rogovin et al. _____ 260—209

LEWIS GOTTS, *Primary Examiner.*

J. R. BROWN, *Assistant Examiner.*